US012770307B2

(12) United States Patent
Zhang et al.

(10) Patent No.: US 12,770,307 B2
(45) Date of Patent: Oct. 20, 2026

(54) REINFORCEMENT LEARNING AGENT TRAINING DEVICE AND METHOD FOR AUTOMATING COLLAGE GENERATION PROCESS

(71) Applicant: SEOUL NATIONAL UNIVERSITY R&DB FOUNDATION, Seoul (KR)

(72) Inventors: Byoung-Tak Zhang, Seoul (KR); Ganghun Lee, Seoul (KR); Minji Kim, Seoul (KR); Minsu Lee, Seoul (KR); Yunsu Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 132 days.

(21) Appl. No.: 18/898,844

(22) Filed: Sep. 27, 2024

(65) Prior Publication Data

US 2025/0285347 A1 Sep. 11, 2025

(30) Foreign Application Priority Data

Mar. 6, 2024 (KR) ........................ 10-2024-0031788

(51) Int. Cl.
*G06T 11/60* (2026.01)

(52) U.S. Cl.
CPC ......... *G06T 11/60* (2013.01); *G06T 2211/441* (2023.08)

(58) Field of Classification Search
CPC ........................... G06T 11/60; G06T 2211/441
See application file for complete search history.

(56) References Cited

FOREIGN PATENT DOCUMENTS

| | | | |
|---|---|---|---|
| KR | 10-0901273 | B1 | 6/2009 |
| KR | 10-2017-0038525 | A | 4/2017 |
| KR | 10-2021-0059775 | A | 5/2021 |
| KR | 10-2291702 | B1 | 8/2021 |
| KR | 10-2405324 | B1 | 6/2022 |

OTHER PUBLICATIONS

Zhang, Mingrui, et al. "Aesthetic photo collage with deep reinforcement learning."Â IEEE Transactions on MultimediaÂ 25 (2022): 4653-4664. (Year: 2022).*

(Continued)

*Primary Examiner* — Said Broome
*Assistant Examiner* — Jordan Wan Yick
(74) *Attorney, Agent, or Firm* — Bridgeway IP Law Group, PLLC; Jihun Kim

(57) ABSTRACT

A reinforcement learning agent training device for automating a collage generation process includes a memory storing a reinforcement learning agent training program; and a processor configured to execute the reinforcement learning agent training program stored in the memory, wherein the reinforcement learning agent training program includes determining an action for a collage when state information including a canvas, a material, a target, and a remaining number of times is input; rendering a second canvas by applying the action to the first canvas; updating a reward based on similarity between the first canvas and the second canvas and the target; and training a reinforcement learning agent by repeating the determining of the action, the rendering of the second canvas, and the updating of the reward.

10 Claims, 14 Drawing Sheets

100

(56) References Cited

OTHER PUBLICATIONS

S. R. Rahmayanti et al. "Sketch Generation From Real Object Images Using Generative Adversarial Network and Deep Reinforcement Learning, "Â2021 13th International Conference on Information & Communication Technology and System (ICTS), Surabaya, Indonesia, 2021, pp. 134-139 (Year: 2021).*
Ganghun Lee et al., "Neural Collage Transfer: Artistic Reconstruction via Material Manipulation", 2023 IEEE/CVF International Conference on Computer Vision (ICCV), Oct. 1, 2023.
Biao Jia et al., "PaintBot: A Reinforcement Learning Approach for Natural Media Painting", arXiv preprint arXiv:1904.02201, Apr. 3, 2019.
Jaskirat Singh et al., "Combining Semantic Guidance and Deep Reinforcement Learning For Generating Human Level Paintings", In Proceedings of the IEEE/CVF Conference on Computer Vision and Patter, 2021.

* cited by examiner

| *Methods* | *CLIP score* ↑ | | | *CLIP vote* ↑ | *LPIPS* ↓ |
|---|---|---|---|---|---|
| | *content* | *human* | *collage* | *collage* | VGG |
| *Target* | 0.276 ± 0.027 | 0.213 ± 0.018 | 0.200 ± 0.017 | 0.633 | - |
| AdaAttn | 0.278 ± 0.021 | 0.247 ± 0.018 | 0.241 ± 0.010 | 0.027 | 0.597 ± 0.103 |
| Adain | 0.251 ± 0.019 | 0.239 ± 0.010 | 0.236 ± 0.008 | 0.017 | 0.662 ± 0.103 |
| Gatys | 0.226 ± 0.013 | 0.260 ± 0.006 | 0.250 ± 0.006 | 0.290 | 0.708 ± 0.098 |
| Perceptual | 0.239 ± 0.019 | 0.246 ± 0.006 | 0.234 ± 0.007 | 0.307 | 0.722 ± 0.117 |
| StyTR-2 | 0.261 ± 0.023 | 0.238 ± 0.010 | 0.235 ± 0.009 | 0.027 | 0.613 ± 0.115 |
| Ours (32) | **0.280 ± 0.026** | 0.262 ± 0.017 | 0.281 ± 0.020 | 0.100 | **0.510 ± 0.111** |
| Ours (64) | 0.262 ± 0.028 | 0.272 ± 0.020 | 0.259 ± 0.015 | 0.667 | 0.565 ± 0.112 |
| Ours (128) | 0.225 ± 0.023 | **0.288 ± 0.015** | **0.272 ± 0.016** | **1.000** | 0.610 ± 0.115 |

FIG. 15

REINFORCEMENT LEARNING AGENT TRAINING DEVICE AND METHOD FOR AUTOMATING COLLAGE GENERATION PROCESS

CROSS-REFERENCE TO RELATED APPLICATION

This application is based on and claims priority under 35 U.S.C. § 119 to Korean Patent Application No. 10-2024-0031788, filed on Mar. 6, 2024, in the Korean Intellectual Property Office, the disclosure of which is incorporated by reference herein in its entirety.

BACKGROUND

The present disclosure relates to a reinforcement learning agent training device and method for automating a collage creation process.

Collage is an art that arranges unrelated image fragments, such as newspapers, magazines, and photographs, as materials to form a single unified image (target image). Originally, collage is completed through a process in which an artist directly selects and arranges materials, and sufficient skill and a lot of time are required to generate a high-quality collage image. This process may be shortened by using a computer. The existing technology for automatically generating collage images by using a computer include a simple calculation-based method and a pixel-based generation method. The simple calculation-based method divides a target image into a checkerboard pattern and inserts images with similar colors into each section, or randomly fills photos in a predetermined shape. The existing method may be easily implemented as the simplest form of automated collage, but the range of expression that may be made as a result is very limited and lacks artistic quality. A pixel-based generation method is a method of converting a target image into a collage-style image or generating a collage-style image from text. In addition, the pixel-based generation method is a technology for image generation itself rather than for collage, and with the development of deep learning technology, a wider range of images may be generated than before, and this is widely known to the public. However, the pixel-based generation method statistically generates an image in units of pixel and only imitates a collage style depending on learning data, and there is no work process like making an actual collage. Therefore, it is difficult to specify collage materials (virtual materials) and to set a clear target image (virtual target image).

Meanwhile, reinforcement learning is one of artificial intelligence technologies and is a technology that accumulates experience (trial and error) by directly interacting with the environment through behavior and maximizes rewards based on the experience. The reinforcement learning has an advantage in that predefined data is not required to learn behaviors. This is a unique feature that is differentiated from a supervised learning technology requiring a lot of data. In addition, the reinforcement learning does not rely on data and may discover and learn good behavioral compositions on its own. It is difficult to apply supervised learning to a certain art field due to issues, such as absolute numbers and copyrights because it is difficult to obtain available data. Moreover, data on the process of making art is even more difficult to obtain, and accordingly, the application of supervised learning is very limited. Therefore, when reinforcement learning is used, the process of making art may be discovered and learned on its own without relying on data.

In particular, collage requires a much more complex decision-making process as materials are involved, and accordingly, an efficient learning environment and method according to collage are needed. However, the conventional calculation-based method are extremely limited in the form and artistry of collage, and pixel-based image generation methods statistically imitate collage styles and place pixels and have limitations that are not generated through a decision-making process required for actual collage.

Therefore, the present disclosure proposes a method by which artificial intelligence learns a decision-making process required for collage generation by itself by using a reinforcement learning model and a method for automating collage generation based on the learned result. Accordingly, the present disclosure may generate collage images by automating all processes required for actual collage generation, such as selecting materials, cutting, and pasting.

Examples of related art include Korean Patent No. 10-2405324 (Title of the Invention: METHOD FOR STUDYING DRAWING WITH DEVICE)

SUMMARY

The present disclosure provides a reinforcement learning agent training device and method for automating a collage generation process by learning a decision-making process required for collage generation by using a reinforcement learning model.

However, technical objects to be achieved by the present embodiments are not limited to the technical objects described above, and there may be other technical objects.

According to an aspect of the present disclosure, a reinforcement learning agent training device for automating a collage generation process includes a memory storing a reinforcement learning agent training program; and a processor configured to execute the reinforcement learning agent training program stored in the memory, wherein the reinforcement learning agent training program includes determining an action for a collage when state information including a canvas, a material, a target, and a remaining number of times is input; rendering a second canvas by applying the action to the first canvas; updating a reward based on similarity between the first canvas and the second canvas and the target; and training a reinforcement learning agent by repeating the determining of the action, the rendering of the second canvas, and the updating of the reward.

According to another aspect of the present disclosure, a training method of a reinforcement learning agent training device for automating a collage generation process includes determining an action for a collage when state information including a canvas, a material, a target, and a remaining number of times is input; rendering a second canvas by applying the action to the first canvas; updating a reward based on similarity between the first canvas and the second canvas and the target; and training a reinforcement learning agent by repeating the determining of the action, the rendering of the second canvas, and the updating of the reward.

According to the present disclosure, prior knowledge on how to autonomously generate a collage through reinforcement learning is not required, and thus, there is no cost for collecting and refining collage data. A training direction may be set differently for each user depending on methods of defining ae reward required for reinforcement learning.

In addition, the present disclosure may know the actual production process of the collage, designate materials, and clearly set a target image. In addition, a user may also participate in a collage production process or insert a series of rules for personalization.

BRIEF DESCRIPTION OF THE DRAWINGS

Embodiments of the inventive concept will be more clearly understood from the following detailed description taken in conjunction with the accompanying drawings in which:

FIG. 14 and FIG. 15 illustrate comparison of a conventional pixel-based methodology with an example of collage generation of a reinforcement learning agent according to an embodiment of the present disclosure.

DETAILED DESCRIPTION OF THE EMBODIMENTS

Figure 1:
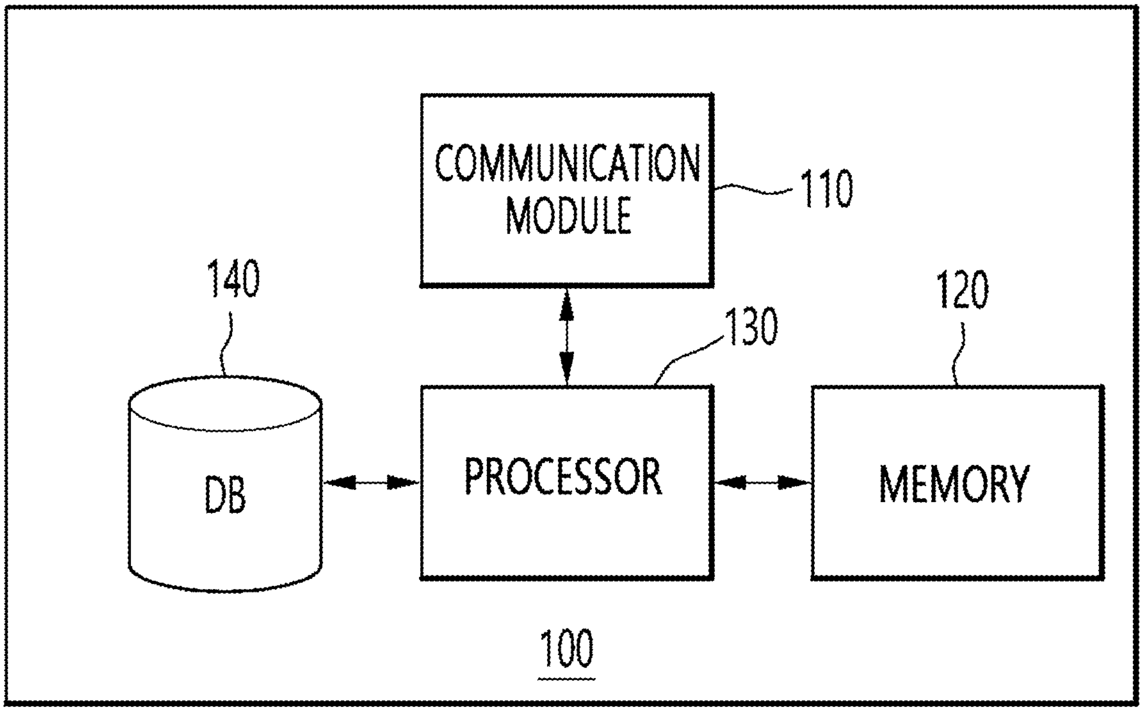
FIG. 1 is a diagram of a reinforcement learning agent training device according to an embodiment of the present disclosure.

Hereinafter, embodiments of the present disclosure will be described in detail with reference to the attached drawings such that those skilled in the art may easily practice the present disclosure. However, the present disclosure may be implemented in various different forms and is not limited to the embodiments described herein. In addition, in order to clearly describe the present disclosure in the drawings, parts that are not related to the description are omitted, and similar parts are assigned similar drawing reference numerals throughout the specification.

Throughout the specification, when a component is described to be "connected" to another component, this includes not only a case where the component is "directly connected to another component", but also a case where the component is "electrically connected" to another component with another element therebetween. Also, when a portion is described to "include" a component, this means that other components may be further included therein without excluding other components unless otherwise specifically stated.

Herein, a term "portion" includes a unit implemented by hardware, a unit implemented by software, and a unit implemented by both the hardware and software. In addition, one unit may be implemented by two or more pieces of hardware, and two or more units may be implemented by one piece of hardware. Meanwhile, a term "portion" is not limited to software or hardware, and the "portion" may be configured to be on an addressable storage medium or configured to reproduce one or more processors. Therefore, as an example, "~ portion" includes components, such as software components, object-oriented software components, class components, and task components, processes, functions, properties, procedures, subroutines, segments of program code, drivers, firmware, microcode, circuits, data, databases, data structures, tables, arrays, and variables. The functions provided in the components and "~ portions" may be combined with a smaller number of components and "~ portions" or may be further divided into additional components and "~ portions". In addition, the components and "~ portions" may be implemented to regenerate one or more central processing units (CPUs) in a device.

A network refers to a connection structure that enables information exchange between respective nodes, such as terminals and servers, and includes a local area network (LAN), a wide area network (WAN), the Internet (WWW: World Wide Web), wired and wireless data communication networks, telephone networks, and wired and wireless television communication networks. A wireless data communication network includes, for example, third generation (3G), fourth generation (4G), fifth generation (5G), third generation partnership project (3GPP), long term evolution (LTE), world interoperability for microwave access (WIMAX), Wi-Fi, Bluetooth communication, infrared communication, ultrasonic communication, visible light communication (VLC), LiFi, and so on but is not limited thereto.

Figure 2:
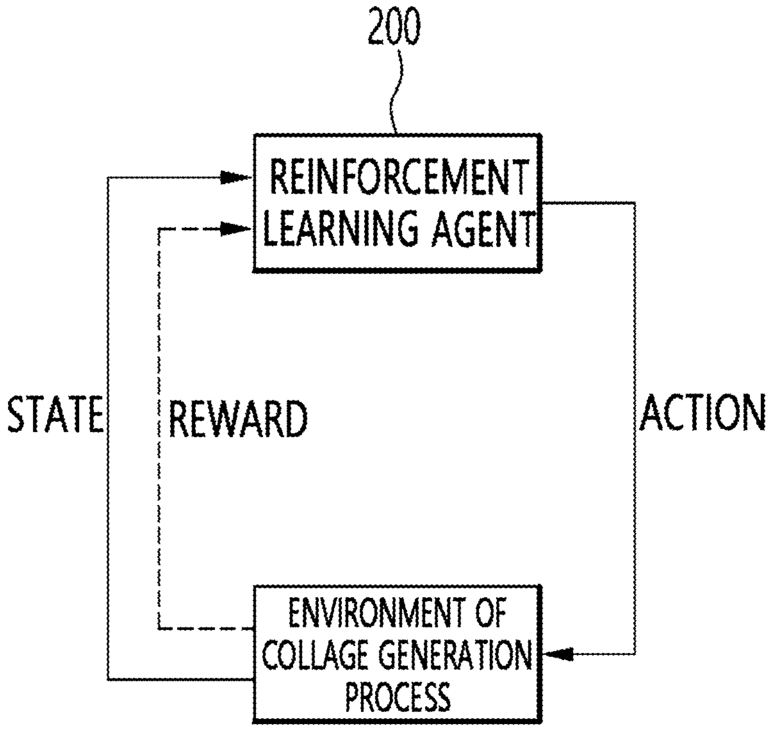
FIG. 2 and FIG. 3 illustrate a reinforcement learning agent training process according to embodiments of the present disclosure.
Figure 3:
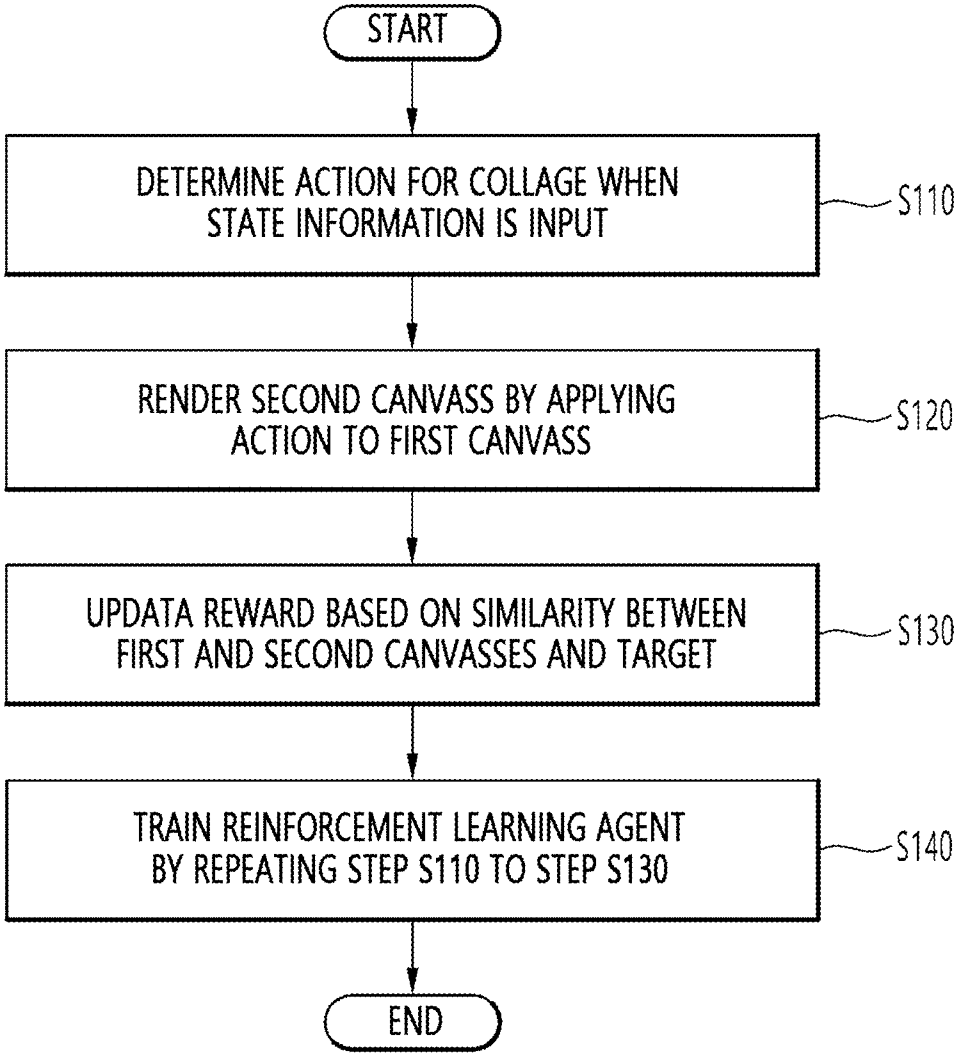

FIG. 1 is a configuration diagram of a reinforcement learning agent training device according to an embodiment of the present disclosure, and FIGS. 2 and 3 illustrate a reinforcement learning agent training process according to embodiments of the present disclosure.

Referring to FIG. 1, a reinforcement learning agent training device 100 may include a communication module 110, a memory 120, a processor 130, and a database 140.

The reinforcement learning agent training device 100 may be implemented by a computer or a portable terminal that may be connected to a network. Here, the computer includes, for example, a desktop computer, a laptop computer, and so on, and the portable terminal may include, for example, a wireless communication device that guarantees portability and mobility and may include all kinds of handheld-based wireless communication devices, such as various smartphones, tablet personal computers (PCs), smart watches, and so on.

In addition, the reinforcement learning agent training device 100 may function as a server that provides a learning result of a reinforcement learning agent using state information including canvas, materials, goals, and remaining number of times to an external computing device. In this case, the server may operate in a cloud computing service model, such as software as a service (SaaS), platform as a service (PaaS), or infrastructure as a service (IaaS), or may be implemented in the form of a private cloud, a public cloud, or a hybrid cloud.

The communication module 110 may be a device including hardware and software necessary for transmitting and receiving signals, such as control signals or data signals through wired or wireless connections with other network devices.

The memory 120 may store a reinforcement learning agent training program. The reinforcement learning agent training program includes step S110 of determining an action for a collage when state information including a canvas, a material, a target, and a remaining number of times is input, step S120 rendering a second canvas by applying the action to the first canvas, step S130 of updating a reward based on similarity between the first canvas and the second canvas and the target, and step S140 of training a reinforcement learning agent 200 by repeating step S110 and step S130. Here, the memory 120 may include magnetic storage media or flash storage media in addition to a volatile storage device that requires power to maintain the stored information, but the scope of the present disclosure is not limited thereto.

The memory 120 may store a separate program, such as an operating system for processing and controlling the processor 130 or may perform a function for temporarily storing input data or output data.

The processor 130 provides a function of executing a reinforcement learning agent training program (hereinafter, referred to as a "program") stored in the memory 120 and controlling hardware of the reinforcement learning agent training device 100 according to the execution of the program. That is, the processor 130 may perform a hardware control function, such as a file system, memory allocation, a network, a basic library, a timer, device control (display, media, input device, 3D, and so on), and other utilities which are required by executing the program.

Referring to FIGS. 2 and 3, the processor 130 includes step S110 of determining an action for a collage when state information including a canvas, a material, a target, and a remaining number of times is input, step S120 of render a second canvas by applying the action to the first canvas, step S130 of updating a reward based on similarity between the first canvas and the second canvas and the target, and step S140 of training the reinforcement learning agent 200 by repeating step S110 and step S130. In addition, specific steps of the learning process of the reinforcement learning agent according to execution of the program will be described below with reference to FIGS. 4 to 8.

The processor 130 may include all types of devices capable of processing data. For example, the processor 130 may indicate a data processing device built in hardware including a physically structured circuit to perform a function expressed by a code or command included in a program. The data processing device built in hardware may include, for example, a microprocessor, a CPU, a processor core, a multiprocessor, an application-specific integrated circuit (ASIC), a field programmable gate array (FPGA), and so on, but the scope of the present disclosure is not limited thereto.

The database 140 stores or provides data required for the reinforcement learning agent training device 100 under the control of the processor 130. For example, the database 140 may store results generated during the training process of the reinforcement learning agent. The database 140 may be included as a separate component from the memory 120 or may be built in a part of the memory 120.

FIGS. 4 to 8 illustrate detailed modules of a reinforcement learning agent training device, according to embodiments of the present disclosure.

Figure 4:
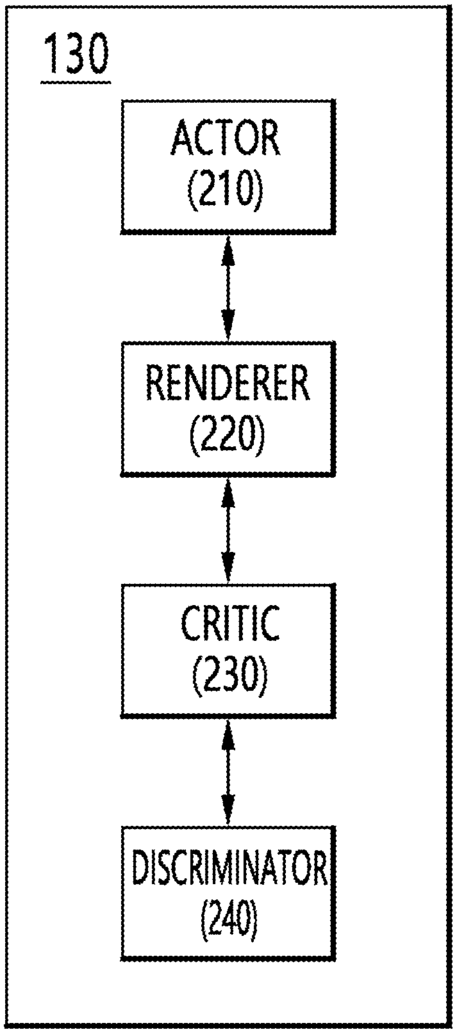
FIG. 4, FIG. 5, FIG. 6, FIG. 7, and FIG. 8 illustrate detailed modules of a reinforcement learning agent training device, according to embodiments of the present disclosure.

Referring to FIG. 4, the processor 130 may implement detailed modules that perform various functions according to the execution of the reinforcement learning agent training program. For example, the reinforcement learning agent training program may be executed by the processor 130 to implement an actor 210, a renderer 220, a critic 230, and a discriminator 240.

Figure 5:
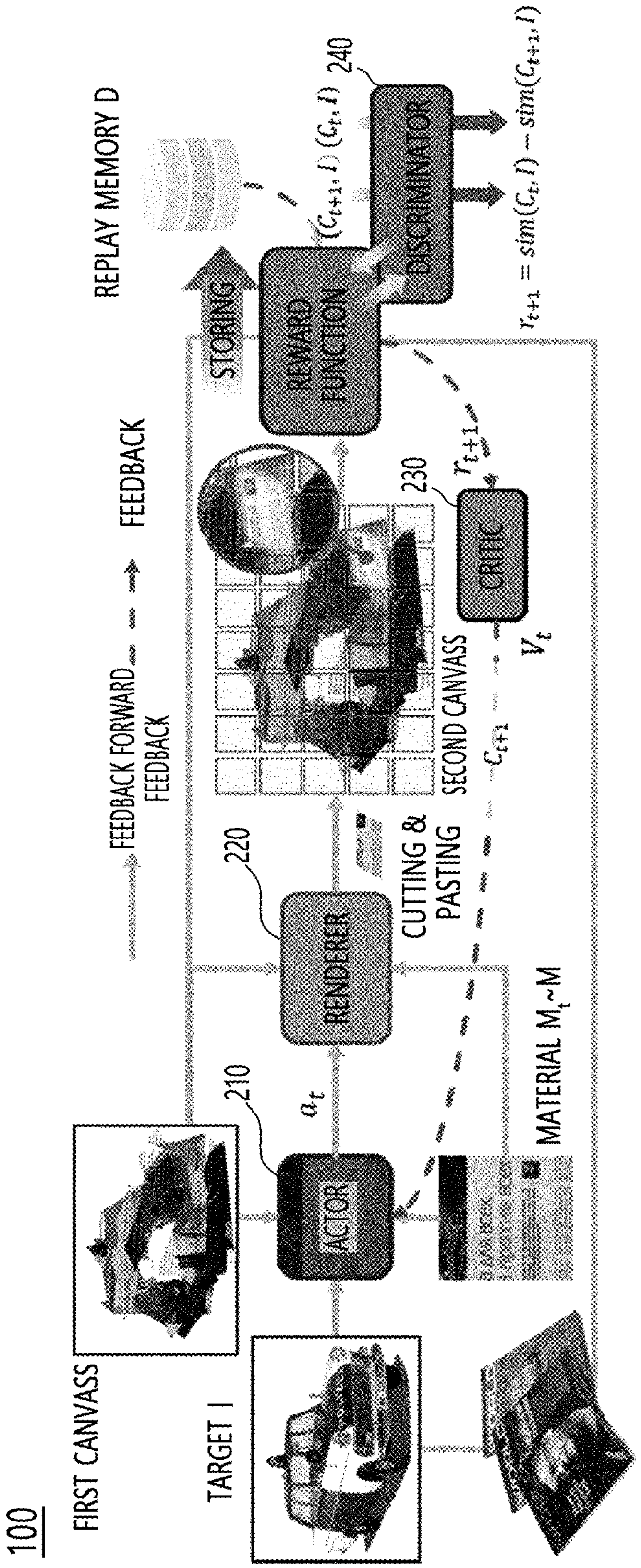

FIG. 5 illustrates a self-training method of a collage generation process by a reinforcement learning agent training device of the present disclosure.

For example, referring to FIG. 5, when the actor 210 observes state information including a canvas, a material, and a target and determines an action, the renderer 220 may manipulate the material according to the action and render the first canvas into a second canvas. In this case, a canvas before manipulation is the first canvas, and a canvas after manipulation is the second canvas. In this case, the actor 210 causes the canvas to be transformed to be closer to the target. To this end, a reward for an action of the actor 210 may be set based on a difference between first similarity between the first canvas and the target (similarity between the canvas before manipulation and the target) and second similarity between the second canvas and the target (similarity between the canvas after manipulation and the target). The critic 230 is learned about how the action determined by the actor 210 affects a future reward, and the actor 210 may continuously learn an action that provides relatively a greater reward. Therefore, the reinforcement learning agent training device 100 may allow the reinforcement learning agent 200 to be trained by using various materials and targets. The trained reinforcement learning agent 200 may generate a collage according to an automated collage generation process that causes the canvas to approach the target, regardless of any target or material.

Specifically, the actor 210 may determine an action required for collage generation when state information including the canvas, materials, targets, and remaining number of times is input. The actor 210 may observe state information including the first canvas, materials, goals, and remaining times to determine actions for the collage.

Here, the canvas is a background image to which the collage material is attached, and is a virtual image frame rather than an actual object, and the target image may already be drawn. And the first canvas is an image before material manipulation, and the second canvas is an image after material manipulation. The material is a material image for creating a collage work, and various conventional image data such as newspapers, magazines, etc. may be used. The goal is a collage image that is ultimately created by repeating the collage creation process of manipulating the material on the canvas for the remaining number of times. The remaining number of times means the number of remaining available materials.

For example, the state information has a form of a matrix that may be input to the actor 210, and the canvas, material, and target are each 3-channel images of RGB, and the remaining number of times is a scalar value which is not an image.

For example, when a size of an image is n*n (width*height), a corresponding image may be represented as a matrix of n*n*3 (3 means 3 channels of RGB). When images of the canvas, material, and target are all adjusted to the same n*n, the images may be merged in a channel dimension and represented as a matrix of n*n*9. The remaining number of times may be represented in the form of n*n*1 by copying a scalar value. Accordingly, the state information may be represented in the form of n*n*10 by merging the matrix in the form of n*n*9 and the matrix in the form of n*n*1 in a channel dimension.

The actor 210 may observe input state information and determine an action. The actor 210 may select a first action element for cutting a material piece and select a second action element for pasting the cut material piece onto the canvas. In this case, the action includes the first action element and the second action element, and the first action element includes a virtual frame, the position of the virtual frame on the material, a width and a height of the virtual frame, and a point position on each side of the virtual frame, and the second action element may include a material piece, a position of the material piece on the canvas, and a rotation angle of the material piece.

For example, the actor 210 may determine the first action element and the second action element. When a square frame for cutting out the material, a position where the square frame is to be placed on the material, a width and a height of the square frame for cutting out the material, and positions (wherein the positions of respective displacement points are determined by a ratio) of respective displacement points of the square frame as the first action element, the material piece may be generated in a square shape generated by connecting four points. That is, a cutting manipulation is performed according to the first action element, and the material piece may be obtained by cutting out the material. The material piece to be pasted on the canvas, a position where the material piece is placed on the first canvas, and a rotation angle at which the material piece is attached may be determined as the second action element. That is, the pasting manipulation is performed according to the second action element, and the material piece is pasted on the first canvas, and thereby, the second canvas may be generated.

Figure 6:
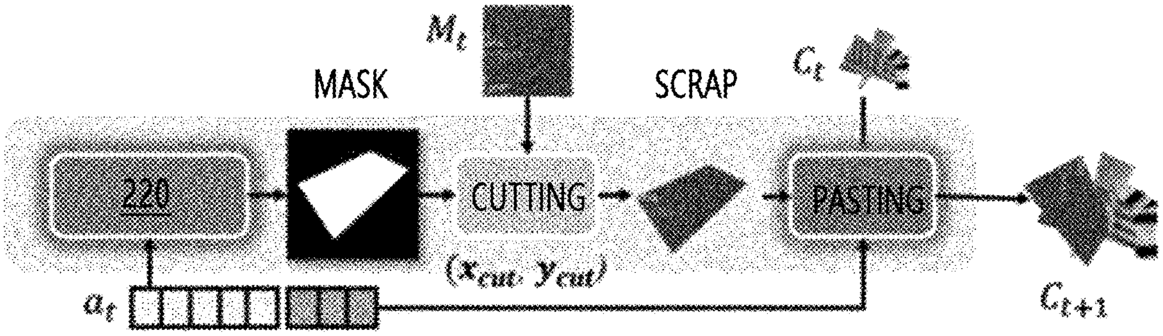

FIG. 6 illustrates the renderer 220 of the present disclosure.

Referring to FIG. 6, the renderer 220 may render the second canvas by applying an action to the first canvas. That is, the renderer 220 may render the first canvas to the second canvas through an action of manipulating (cutting and pasting) the material.

For example, a state transition process through the renderer 220 may be divided into the first canvas (a first state) before attaching a new material piece, attaching (action) a new material piece to the first canvas, and the second canvas (a second state) with the new material piece attached thereto. In this case, a rendering process may use a differentiable image operation and a separate pre-trained network (shaper).

For example, the renderer 220 may generate a mask corresponding to a virtual frame based on the first action element, generate a material piece by cutting out a material by using the mask, and generate the second canvas by attaching the material piece to the first canvas based on the second action element.

For example, the renderer 220 may output a mask having a shape of a material piece determined according to the input first action element. In this case, when the material is multiplied by the mask, the material piece may be cut according to the shape of the mask. Thereafter, the renderer 220 may attach the material piece to the first canvas according to the input second action element. In this case, a differentiable image operation (transition and rotation), an arithmetic operation, and so on may be applied according to the second action element, and thereby, the material piece may be attached to the first canvas. As a result, when the first canvas and the action (first action element/second action element) are input to the renderer 220, the next second canvas may be output through a series of differentiable processes. In this case, the renderer 220 is a state transition function which may be designed to be differentiable for compatibility with a reinforcement learning algorithm.

For example, the present disclosure may train the reinforcement learning agent 200 by using Equation 1, which is an objective function of a model-based soft actor-critic (SAC) constructed by modifying a SAC. Accordingly, the present disclosure is effective for collage learning because the reinforcement learning agent 200 may know the state transition function or a reward function (model).

Equation 1

$$J_V = \mathbb{E}_{(s_t,a_t)\sim\mathcal{D}}\left[\frac{1}{2}\left(V(s_{t+1}) - \mathbb{E}_{a_{t+1}\sim\pi}\left[r(s_{t+1}, a_{t+1}) + \gamma\mathbb{E}_{s_{t+2}\sim\mathcal{P}}[V(s_{t+2})] - \alpha\log(\pi(a_{t+1}|s_{t+1}))\right]\right)^2\right],$$

-continued $$J_\pi = \mathbb{E}_{s_t\sim\mathcal{D}}\left[\mathbb{E}_{a_t\sim\pi}\left[\alpha\log(\pi(a_t|s_t)) - \left(r(s_t, a_t) + \mathbb{E}_{s_{t+1}\sim\mathcal{P}}[V(s_{t+1})]\right)\right]\right].$$

Here, V is a critic (value function), Jv is an objective function for critic training, D is an experience data storage (replay buffer) for training, t is time, s is a state, a is an action, π is an actor (policy), Jπ is an objective function for actor training, r is a reward function, P is a state transition function, γ (gamma) is a discount rate, and α (alpha) is an entropy adjustment coefficient in SAC.

Figure 7:
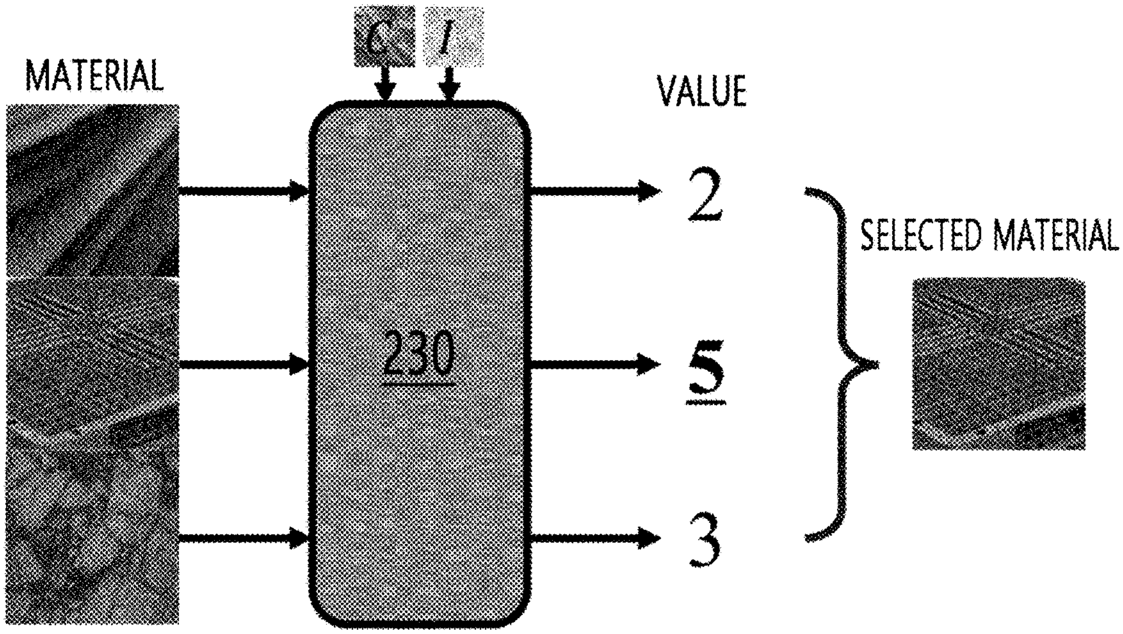

FIG. 7 illustrates the critic 230 of the present disclosure.

Referring to FIG. 7, in the process of selecting a material from among pieces of state information, the critic 230 may output the highest state value for a material having the highest value of a difference between the first similarity and the second similarity for each material.

For example, the critic 230 may be trained to infer a state value by replacing only the material with various types of materials while maintaining a canvas, a target, and remaining number of times among the pieces of state information.

The actor 210 determines the action according to the given material in the process of generating a collage, and accordingly, it does not matter when and which material is provided, but when multiple materials are given at the same time, the optimal material exists depending on the state and target of the first canvas at that moment. Accordingly, when a canvas C, a target I, and multiple materials M are input, the critic 230 may infer a state value by using the first similarity and the second similarity generated by the discriminator 240. For example, the critic 230 may select a material that outputs the highest difference state value between the first similarity between the first canvas C and the target I and the second similarity between the second canvas C and the target I among the multiple materials.

Figure 8:
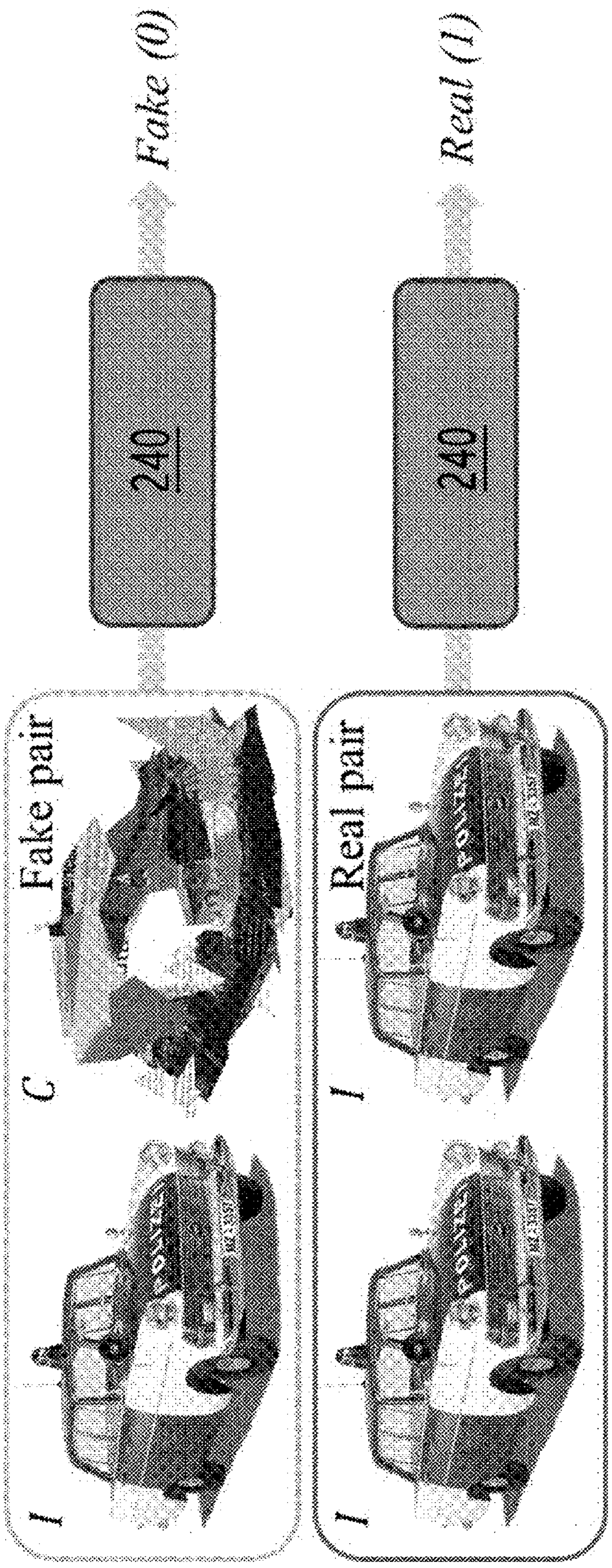

FIG. 8 illustrates the discriminator 240 of the present disclosure.

For example, the discriminator 240 may update a reward based on a similarity between the first canvas and the second canvas and the target. Specifically, the discriminator 240 may use a difference between the first similarity between the first canvas and the target and the second similarity between the second canvas and the target as a reward.

Referring to FIG. 8, the discriminator 240 may be trained in a regression manner by pairing the canvases (the first canvas and the second canvas) generated during training and targets corresponding thereto such that a pair of the target I and the canvas C are distinguished as 0 and a pair of the target I and the target I are distinguished as 1. That is, the discriminator 240 may output a value closer to 1 as the canvas approaches the target, and may play a role in evaluating the similarity.

For example, when there is the first canvas and the second canvas generated by applying an action, the discriminator 240 may calculate the first similarity and the second similarity and calculate how much the similarity of the second canvas to the target increases compared to the first canvas. The reinforcement learning agent 200 may define the calculated value as a reward for the action. In addition, the discriminator 240 may be continuously trained while reinforcement learning is in progress.

Therefore, as performance of the reinforcement learning agent 200 increases, performance of the discriminator 240 also increases, and accordingly, there is an advantage in that a relative criterion matching the performance of the reinforcement learning agent 200 may be provided rather than an absolute criterion such as MSE. In addition, since training is made to identify the similarity of the collage work itself, the similarity may be evaluated in the collage context rather than a simple pixel comparison.

When a user inputs a target of a collage work, the reinforcement learning agent 200 observes the state information based on the target to determine an action for the collage, applies the action to the first canvas, and repeatedly performs a collage generation process of rendering the second canvas according to the remaining number of times, thereby outputting the collage work corresponding to the target.

Figure 9:
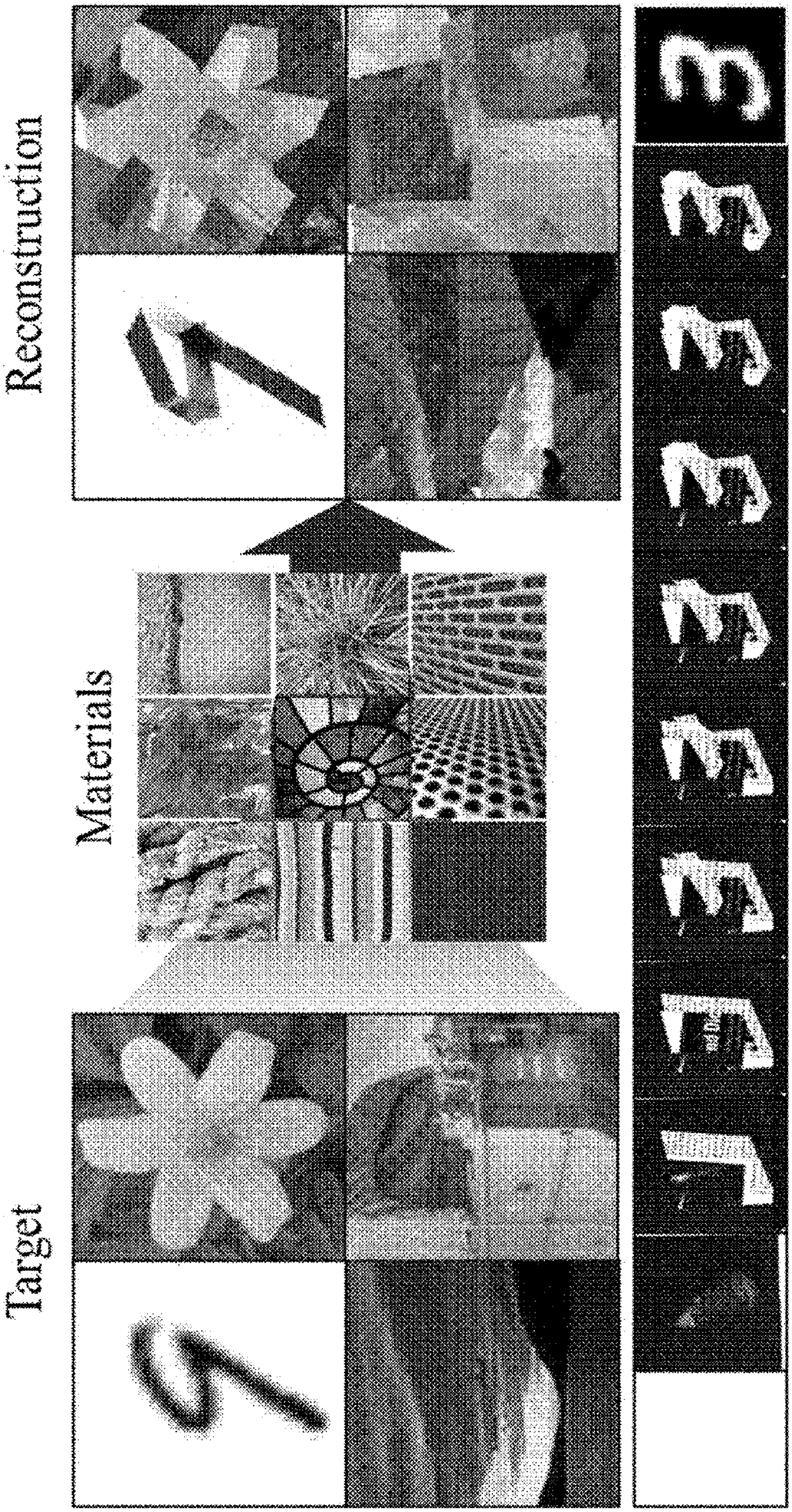
FIG. 9 is a view illustrating a collage generation process of a reinforcement learning agent according to an embodiment of the present disclosure.

FIG. 9 illustrates a collage generation process of the reinforcement learning agent according to an embodiment of the present disclosure.

When the target image is input to the reinforcement learning agent 200, the reinforcement learning agent 200 repeats the collage generation process of cutting and pasting materials to the first canvas to create the second canvas, thereby providing a reconstructed image with high similarity to the target image as a collage work. Although FIG. 9 illustrates an example in which the collage work is completed while materials are sequentially attached to the first canvas of a white background in the process of generating a collage for a target image of a number 3, the first canvas is not limited to the white background.

FIGS. 10 to 13 illustrate examples of generating a collage by using a reinforcement learning agent according to an embodiment of the present disclosure.

According to the embodiment of the present disclosure, the actor 210 and the critic 230 are configured by using a ResNet-18 network based on a convolutional neural network (CNN), and a reward function is designed and trained by using the ResNet-18 network based on the CNN and by deriving similarity between the target and the canvas image by using SAC as a reinforcement learning algorithm and using a network having a structure of the discriminator 240 of a generative adversarial network (GAN). Here, as illustrated in FIG. 10, an image similarity (MSE) graph for each image dataset according to a result of the training may be obtained.

For example, during training, a target image may be randomly changed every time a work is finished, and a material image may be randomly changed every time the use of a material is finished. In addition, the material image or target image may not expect the next material image or target image by obtaining diversity of the image dataset (for example, an ImageNet) to be imported and may train the reinforcement learning agent 200 to select an action according to the given situation at that time.

Figure 10:
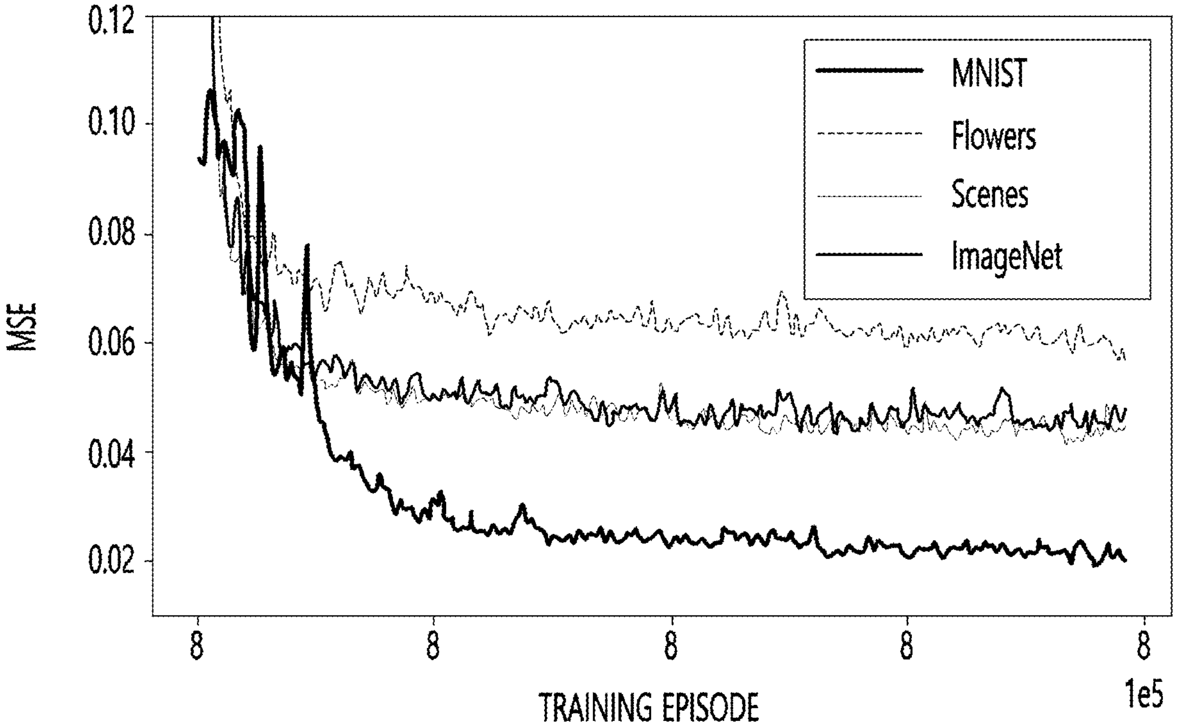
FIG. 10, FIG. 11, FIG. 12, and FIG. 13 illustrate examples of collage generation of a reinforcement learning agent according to an embodiment of the present disclosure.

FIG. 10 illustrates that the image similarity (MSE criterion) between the target and the second canvas decreases while the reinforcement learning agent of the present disclosure repeats training.

Figure 11:
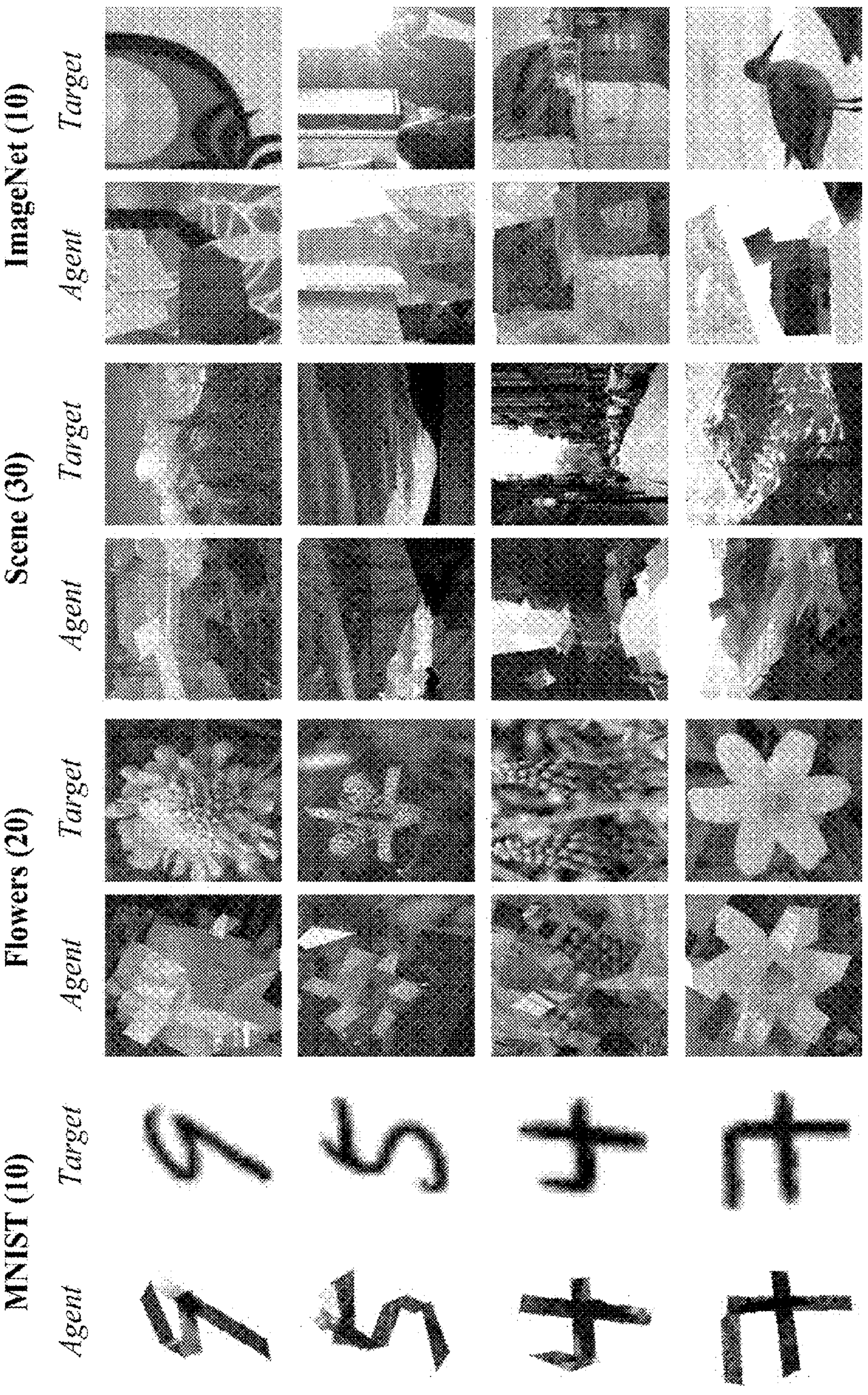

FIG. 11 illustrates a collage result obtained by inputting target images classified into number images MNIST, flower images Flowers, landscape images Scene, and graphic images ImageNet to the reinforcement learning agent of the present disclosure, and learning, and outputting a result of the learning. In this case, the material image is provided as an image of various textures and colors.

Figure 12:
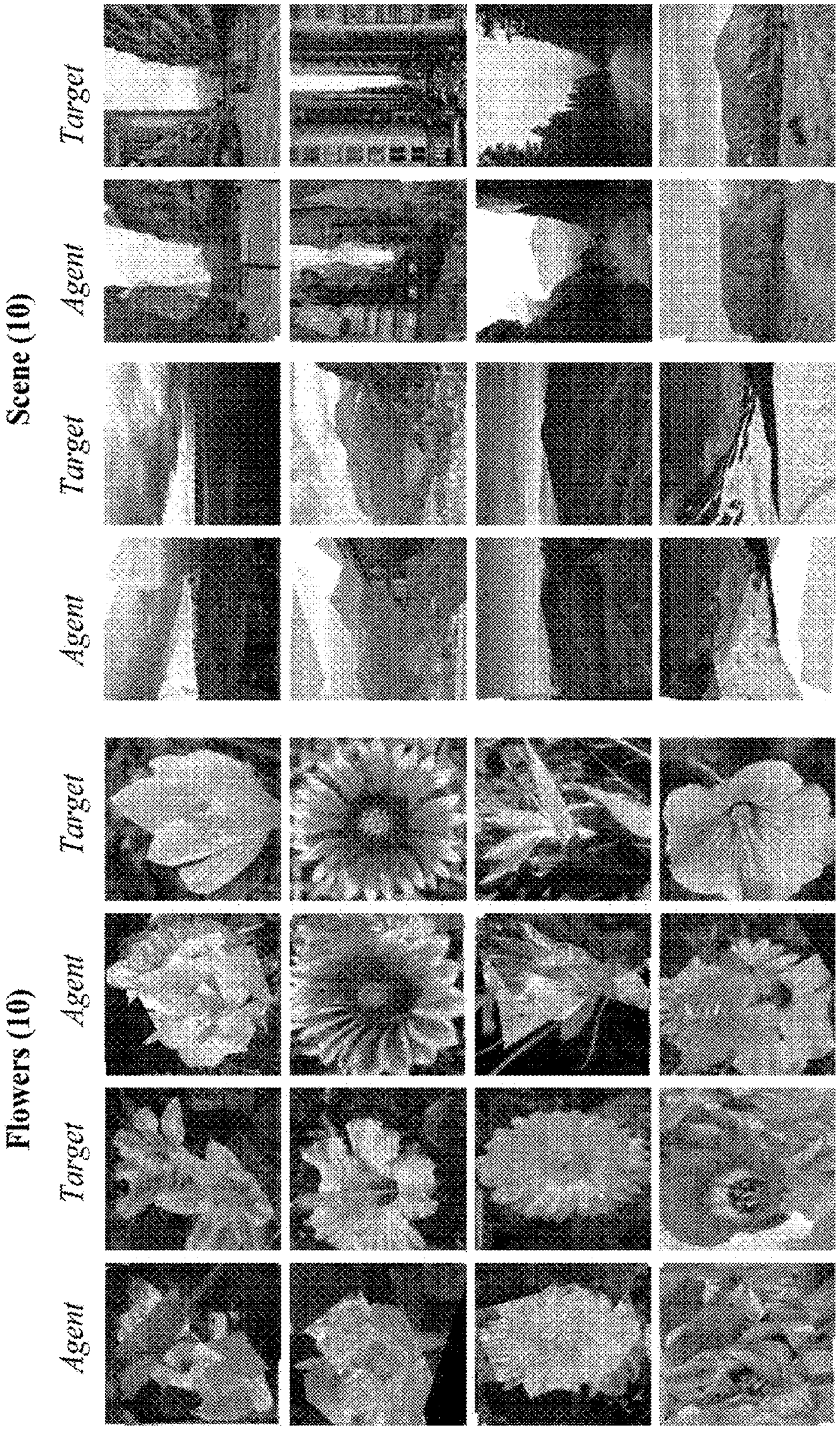

FIG. 12 is a collage result obtained by inputting target images classified as flowers and scenes to the reinforcement learning agent of the present disclosure, limiting the type of material images provided during a collage generation process to material images similar to the target images, learning, and outputting a result of the learning.

Figure 13:
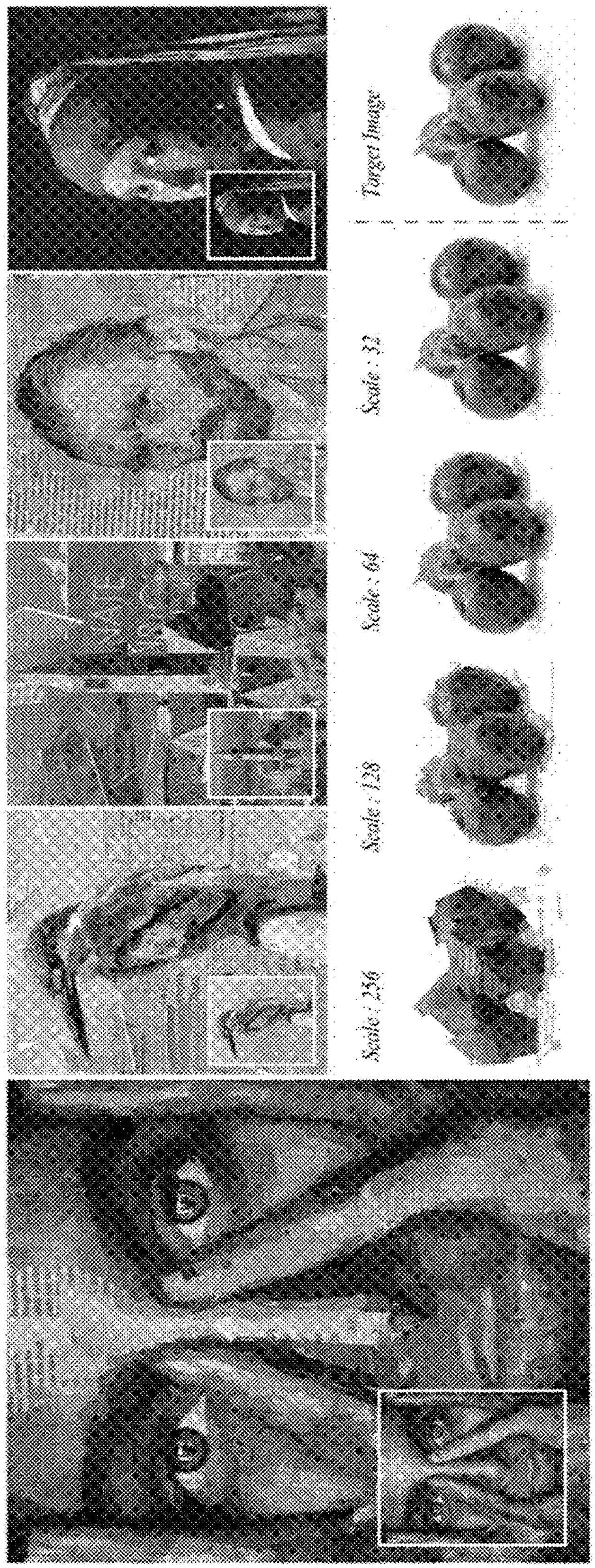

FIG. 13 illustrates an example of the reinforcement learning agent of the present disclosure which is applied to a large-scale images by being expanded in a segmentation performance manner. For example, since a picture is completed by gathering parts, a collage may be easily performed in a segmentation manner for high-resolution images. Here, views illustrated in FIG. 13 are processed in more detail for complex parts. Since the trained reinforcement learning agent 200 generates a collage by making decisions at each step without generating the collage all at once, it is relatively free from intervention of other action elements during the entire collage generation process. Therefore, the reinforcement learning agent 200 may be personalized.

Figure 14:
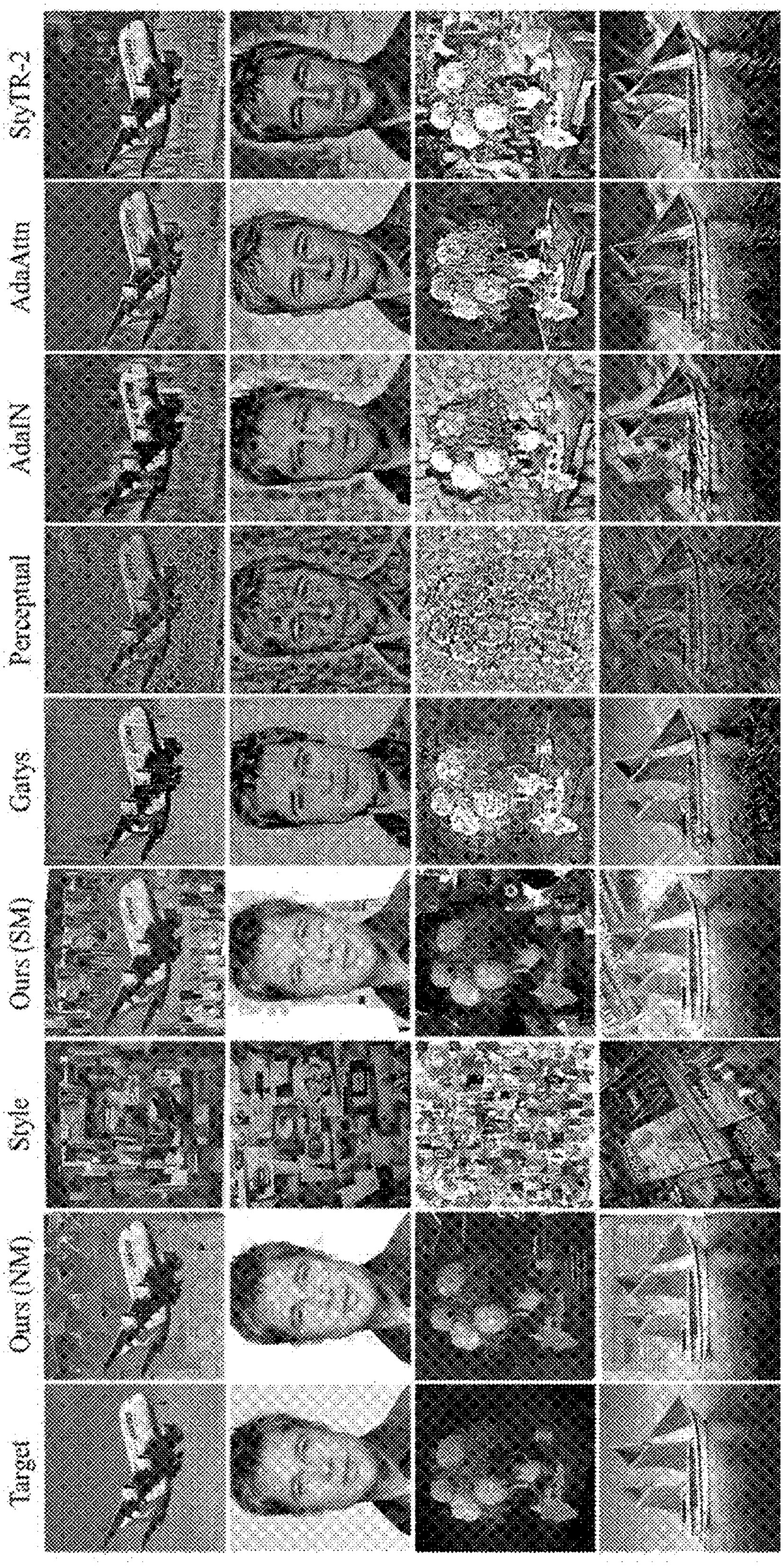

FIGS. 14 and 15 illustrate a comparison between the known pixel-based methodology and the reinforcement learning agent according to the embodiment of the present disclosure.

FIG. 14 illustrates a comparison between the known pixel-based methodology (Gatys/Perceptual/AdaIN/AdaAttn/StyTR-2) and an image generation result of the reinforcement learning agent 200.

As illustrated FIG. 14, the pixel-based methodology generates unique images, but the unique images are far from an actual collage. However, the reinforcement learning agent 200 of the present disclosure generates images similar to an actual collage.

FIG. 15 is a result of comparison between the image generation results of FIG. 14 through a large-scale language model CLIP and LPIPS which is one of image similarity measurement methods.

As illustrated in FIG. 15, by the comparison using the CLIP, it can be seen how much the texts, such as "collage" or "human-made work", match resulting images. A similarity measurement is made through the CLIP trained with millions of text-image pairs. Therethrough, it can be seen how much CLIP agrees that resulting images are an actual collage. In addition, an image generated by the reinforcement learning agent 200 of the present disclosure may be numerically compared with an image generated by the pixel-based methodology. In addition, by finding out how much the text (for example, a "red apple") on a target image used to obtain a result image matches the result image, it is possible to compare how much the content of a target is distorted when generating the collage. A result of comparison shows that a collage work generated by the reinforcement learning agent 200 of the present disclosure is more similar to an actual collage work than a work generated by a pixel-based method, and that the content of the target is well maintained. Similarly, the comparison of the similarity (difference) between the target image and the generated result image by using LPIPS also shows that the collage work generated by the reinforcement learning agent 200 of the present disclosure obtains a higher similarity (lower difference).

In the following, the description of the same configuration among the above-described configurations is omitted.

Referring back to FIG. 3, the training method of the reinforcement learning agent training device for automating the collage generation process includes step S110 of determining an action for a collage when state information including a canvas, a material, a target, and a remaining number of times is input, step S120 rendering a second canvas by applying the action to the first canvas, step S130 of updating a reward based on similarity between the first canvas and the second canvas and the target, and step S140 of training a reinforcement learning agent 200 by repeating step S110 and step S130.

In step S110, a first action element for cutting a material piece is selected, and a second action element for pasting the cut material piece onto the canvas is selected, wherein the first action element includes a virtual frame, the position of the virtual frame on the material, a width and a height of the virtual frame, and a point position on each side of the virtual frame, and the second action element may include a material piece, a position of the material piece on the canvas, and a rotation angle of the material piece.

At step S120, a mask corresponding to a virtual frame may be generated based on the first action element, a material piece may be generated by cutting out a material by using the mask, and the second canvas may be generated by attaching the material piece to the first canvas based on the second action element.

In step S130, a difference between a first similarity between the first canvas and the target and a second similarity between the second canvas and the target may be used as a reward.

In the process of selecting a material from among pieces of state information before step S110, the highest state value may be output for a material with the highest value of a difference between the first similarity and the second similarity for each material.

When a user inputs a target of a collage work, the reinforcement learning agent 200 observes the state information based on the target to determine an action for the collage, applies the action to the first canvas, and repeatedly performs a collage generation process of rendering the second canvas according to the remaining number of times, thereby outputting the collage work corresponding to the target.

A training method according to an embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

Although the method and system of the present disclosure are described with respect to specific embodiments, some or all of components or operations thereof may be implemented by using a computer system having a general-purpose hardware architecture.

The above descriptions of the present disclosure are for illustrative purposes only, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and similarly, components described in a distributed manner may also be implemented in a combined form.

The scope of the present disclosure is indicated by the claims described below rather than the detailed description above, and all changes or modifications derived from the meaning and scope of the claims and their equivalent concepts should be interpreted as being included in the scope of the present disclosure.

What is claimed is:

1. A reinforcement learning agent training device for automating a collage generation process, the reinforcement learning agent training device comprising:
- a memory storing a reinforcement learning agent training program; and
- a processor configured to execute the reinforcement learning agent training program stored in the memory,
- wherein the reinforcement learning agent training program, when executed by the processor, configured to perform steps of:
- determining an action for a collage when state information including a canvas, a material, a target, and a remaining number of times is input;
- rendering a second canvas by applying the action to the canvas;
- updating a reward based on similarity between the canvas and the second canvas and the target; and
- training a reinforcement learning agent by repeating the determining of the action, the rendering of the second canvas, and the updating of the reward, wherein,
- in the determining of the action, the reinforcement learning agent training program selects a first action element for cutting a material piece and selects a second action element for pasting the material piece onto the canvas,
- the first action element includes a virtual frame, a position of the virtual frame on the material, a width and a height of the virtual frame, and a point position on each side of the virtual frame, and
- the second action element includes the material piece, a position of the material piece on the canvas, and a rotation angle of the material piece.

2. The reinforcement learning agent training device of claim 1, wherein,
- in the rendering of the second canvas, the reinforcement learning agent training program generates a mask corresponding to the virtual frame based on the first action element, generates the material piece by cutting out the material by using the mask, and generates the second canvas by attaching the material piece to the canvas based on the second action element.

3. The reinforcement learning agent training device of claim 1, wherein,
- in the updating of the reward, the reinforcement learning agent training program uses a difference between first similarity between the canvas and the target and second similarity between the second canvas and the target, as the reward.

4. The reinforcement learning agent training device of claim 3, wherein,
- in a process of selecting the material from the state information, the reinforcement learning agent training program outputs a highest state value for a material having a highest value of the difference between the first similarity and the second similarity for each material.

5. The reinforcement learning agent training device of claim 1, wherein
- when a user inputs a target of a collage work, the reinforcement learning agent outputs the collage work corresponding to the target by observing the state information based on the target, by determining an action for the collage, by applying the action to the canvas, and by repeatedly performing a collage generation process of rendering the second canvas according to the remaining number of times.

6. A training method of a reinforcement learning agent training device for automating a collage generation process, the training method comprising:

determining, by a processor of the reinforcement learning agent training device, an action for a collage when state information including a canvas, a material, a target, and a remaining number of times is input;

rendering, by the processor, a second canvas by applying the action to the canvas;

updating, by the processor, a reward based on similarity between the canvas and the second canvas and the target; and training, by the processor, a reinforcement learning agent by repeating the determining of the action, the rendering of the second canvas, and the updating of the reward, wherein, in the determining of the action, a reinforcement learning agent training program selects a first action element for cutting a material piece and selects a second action element for pasting the material piece onto the canvas, the first action element includes a virtual frame, a position of the virtual frame on the material, a width and a height of the virtual frame, and a point position on each side of the virtual frame, and the second action element includes the material piece, a position of the material piece on the canvas, and a rotation angle of the material piece.

7. The training method of the reinforcement learning agent training device of claim 6, wherein, in the rendering of the second canvas, a mask corresponding to the virtual frame is generated based on the first action element, the material piece is generated by cutting out the material by using the mask, and the second canvas is generated by attaching the material piece to the canvas based on the second action element.

8. The training method of the reinforcement learning agent training device of claim 6, wherein, in the updating of the reward, a difference between first similarity between the canvas and the target and second similarity between the second canvas and the target is used as the reward.

9. The training method of the reinforcement learning agent training device of claim 8, wherein, in a process of selecting the material from the state information, a highest state value for the material having a highest value of the difference between the first similarity and the second similarity for each material is output.

10. The training method of the reinforcement learning agent training device of claim 6, wherein when a user inputs a target of a collage work, the reinforcement learning agent outputs the collage work corresponding to the target by observing the state information based on the target, by determining an action for the collage, by applying the action to the canvas, and by repeatedly performing a collage generation process of rendering the second canvas according to the remaining number of times.

* * * * *